United States Patent [19]
Hamielec et al.

[11] Patent Number: 6,093,211
[45] Date of Patent: Jul. 25, 2000

[54] POLYMER PROPERTY DISTRIBUTION FUNCTIONS METHODOLOGY AND SIMULATORS

[75] Inventors: Alvin E. Hamielec, Burlington, Canada; Martine Osias, Cambridge, Mass.; Sundaram Ramanathan, Lexington, Mass.; Ashuraj Sirohi, No. Andover, Mass.; Chau-Chyun Chen, Lexington, Mass.

[73] Assignee: Aspen Technology, Inc., Cambridge, Mass.

[21] Appl. No.: 09/057,795

[22] Filed: Apr. 9, 1998

[51] Int. Cl.[7] .................................................... G06G 7/58
[52] U.S. Cl. .............................. 703/12; 702/30; 702/31; 700/269; 703/6
[58] Field of Search .................... 395/500.33, 500.27, 395/500.23; 702/31, 30; 364/528.01, 528.08; 526/79

[56] References Cited

U.S. PATENT DOCUMENTS

| | | | |
|---|---|---|---|
| 5,023,802 | 6/1991 | Fujita | 395/500.27 |
| 5,260,882 | 11/1993 | Blanco et al. | 395/500.27 |
| 5,475,067 | 12/1995 | Schiffino | 526/79 |
| 5,625,579 | 4/1997 | Hinsberg et al. | 395/500.33 |
| 5,687,090 | 11/1997 | Chen et al. | 395/500.27 |
| 5,946,480 | 8/1999 | Sughrue, II et al. | 395/500.33 |

FOREIGN PATENT DOCUMENTS

| | | |
|---|---|---|
| 0 398 706 A2 | 11/1990 | European Pat. Off. . |
| WO 96/41822 | 12/1996 | WIPO . |

OTHER PUBLICATIONS

Soares, J. B. P.; Hamielec, A. E.; "Deconvolution of Chain-Length Distributions of Linear Polymers Made by Multiple–Site–Type Catalysts", Polymer, vol. 36, Issue 11, pp. 2257–2263, May 1995.

Debling, J. A.; Han, G. C.; Kuijpers, F.; VerBurg J.; Zacca, J.; Ray, W. H.;"Dynamic Modeling of Product Grade Transitions for Olefin Polymerization Processes", AIChE Journal, vol. 40, No. 3, pp. 506–520, Mar. 1994.

(List continued on next page.)

*Primary Examiner*—Kevin J. Teska
*Assistant Examiner*—Douglas W. Sergent
*Attorney, Agent, or Firm*—Hamilton, Brooks, Smith & Reynolds, P.C.

[57] ABSTRACT

A process simulator and modeling methodology employs instantaneous property measures. The instantaneous measures of various polymer properties are tracked throughout the subject polymer manufacturing system and used to calculate respective property distribution functions. For example, property distributions of composition, molecular weight, stereoregularity and long chain branching are calculated, tracked in time and location throughout the manufacturing system, and used to model the polymer manufacturing system and polymerization process performed by the system. More specifically, the present invention calculates full distribution of polymer properties from the instantaneous property measures and tracked instantaneous property distributions. This enables accurate and computationally efficient modeling of the polymerization process and manufacturing system for carrying out the same. The present invention method and apparatus thus enables modeling of polymer manufacturing systems (a) operating under transient or steady-state conditions, using free radicals or catalysts with a plurality of active center types, and having reactor types of CSTR, PFTR or any combinations thereof operating in batch, semi-batch or continuous operation, and (b) for carrying out polymerization processes including solution, slurry, gas phase, suspension and emulsion polymerizations.

23 Claims, 2 Drawing Sheets

OTHER PUBLICATIONS

Tuzun, R. E.; Noid, D. W.; Sumpter, B. G.;"Computer Modeling and Simulation of Macromolecular Systems: Approaching the Experimental Regime", Trends in Polymer Science, vol. 4, Issue 7, pp. 223–228, Jul. 1996.

Kotelyanskii, M.; "Simulation Method for Modeling Amorphous Polymers", Trends In Polymer Science, vol. 5, Issue 6, pp. 1992–198, Jun. 1997.

Tobita, H.;"Simulation Model for the Modification of Polymers via Crosslinking and Degradation", Polymer, vol. 36, Issue 13, pp. 2585–2596, Jan. 1995.

Hyanek, L.; Zacca, J.; Teymour F.; Ray W. H.; "Dynamcis and Stability of Polymerization Process Flowsheets Using Polyred", Adv. Control Chem. Processes, IFAC Symposium, Pergamon Oxford, UK, pp. 235–241, Jan. 1994.

Konstadinidis et al.; "Development of a Unified Mathematical Framework for Modelling Molecular and Structural Changes in Free–Radical Homopolymerization Reactions", Polymer, 1992, vol. 33, No. 23, pp. 5019–5031.

POLYRED 4.0 (POLYRED Components. Datasheet [online]. University of Wisconsin, Feb. 1996 [retrieved Jul. 12, 1999]. Retrieved from the Internet at http://whr008.che.wisc.edu/UWPREL/POLYRED/Components.html.).

Hamielec, A.E., et al., "Polymerization Processes," *Ullmann's Encyclopedia of Industrial Chemistry*, A21:317–336 (1992).

Abdel–Alim, A.H., et al., "Bulk Polymerization of Vinyl Chloride," *Journal of Applied Polymer Science*, 16:783–799 (1972).

Balke, S.T., et al., "Bulk Polymerization of Methyl Methacrylate," *Journal of Applied Polymer Science*, 17:905–949 (1973).

Garcia–Rubio, L.H., et al., "Bulk Polymerization of Acrylonitrile. II. Model Development," *Journal of Applied Polymer Science*, 23:1413–1429 (1979).

Kim, C.J., et al., "Polymerization of Acrylamide with Diffusion–Controlled Termination," *Polymer*, 25:845 (Jun. 1984).

Chiantore, O., et al., "Thermal polymerization of p–Methyl Styrene at High Conversions and Temperatures," *Polymer*, 26:608 (Apr. 1985).

Bhattacharya, D., et al., "Bulk Thermal Copolymerization of Styrene/ p–Methylstyrene: Modelling Diffusion–Controlled Termination and Propagation Using Free–Volume Theory," *Polymer*, 27:611 (Apr. 1986).

Jones, K.M., et al., "An Investigation of the Kinetics of Copolymerization of Methyl Methacrylate/p–Methyl Styrene in High Conversion: Modelling Diff"sion–Controlled Termination and Propagation by Free–Volume Theory," *Polymer*, 27:602 (Apr. 1986).

Yaraskavitch, I.M., et al., "An Investigation of the Kinetics of Copolymerization of p–Methylstyrene/Acrylonitrile to High Conversion: Modelling Diffusion–Controlled Termination and Propagation by Free–Volume Theory," *Polymer*, 28:489 (Mar. 1987).

Zhu, S., et al., "Chain–Length–Dependent Termination for Free Radical Polymerization," *Macromolecules*, 22:3093–3098 (1989).

Thomas, S., et al., "Free Radical Polymerization—An Elegant Method of Solving the Population Balance Equations with Chain Transfer to Polymer," *Polymer Reaction Engineering*, 5(4):183–203 (1997).

Wulkow, M., "The Simulation of Molecular Weight Distributions in Polyreaction Kinetics by Discrete Galerkin Methods," *Macromol. Theory Simul.* 5:393–415 (1996).

Stockmayer, W.H., "Distribution of Chain Lengths and Compositions in Copolymers," *The Journal of Chemical Physics*, 13(6):199–207 (1945).

Wulkow, M., "Predici®, Simulation of Polyreaction Kinetics," Brochure of C i T GmbH, Rastede, Germany.

Kiparissides, C., "Polymerization Reactor Modeling: A Review pf Recent Developments and Future Directions," *Chemical Engineering Science* 51:10, pp. 1637–1659 (1996).

POLYMER PROPERTY DISTRIBUTION FUNCTIONS METHODOLOGY AND SIMULATORS

BACKGROUND

Numerous articles (particularly those of synthetic material such as plastics and rubber) are produced by a respective chemical process, namely polymerization. Each such chemical process/polymerization involves a complex chemical reaction brought about in a reactor or network of reactors and ancillary equipment (e.g., distillation towers, dryers, extruders, etc.) Typically, the chemical process and polymer manufacturing systems (i.e., reactors and ancillary equipment) are expressed in terms of formulas or equations for purposes of modeling or simulating the chemical process/polymer manufacturing system.

The demands on simulation models for polymerization reactor processes and polymer manufacturing systems in general is growing due to advanced technology for polymerization catalysts such as metallocene catalysts. There is a rapidly growing need for simulation models to calculate full distributions of composition, molecular weight and long chain branching. This presents serious problems related to information transfer efficiency for both steady-state and dynamic simulations of polymer reactor systems which are part of a larger polymer manufacturing system.

Commonly the population balance equations of the subject polymer manufacturing system are solved by mathematically integrating either solving for species or solving for moments of distribution. The solution of the very large sets of algebraic and ordinary differential equations which comprise the population balance equations appears impossible even with the largest and fastest computers available today. Another problem which presents itself is the need to transfer concentration data of the very large number of polymer species (perhaps as many as $10^5$) through the network of polymer reactors and other process units in the polymer manufacturing system.

An efficient simulation strategy which gives high information transfer efficiency employs the method of using moments of the distribution (called the "method of moments") to calculate average polymer properties. (See U.S. Pat. No. 5,687,090, issued Nov. 11, 1997 to assignee of the present invention). Although the strategy satisfies many demands of polymer process simulators, it has one weakness which cannot be overcome without a complete change in polymer process/reactor modeling strategy. When polymer distributions in composition, molecular weight and long chain branching are complex (having a shoulder or bimodal, for example), these distributions cannot be accurately constructed (or reconstructed) given the moments of these distributions. In fact, the process of constructing complex distributions given moments (as many as one wishes) leads to multiple solutions and possible large errors.

In contrast to the method of moments, instantaneous property methods have been studied in isolated incidences. W. H. Stockmayer in *J.Chem.Phys.* 13:199 (1945) derives and discloses a useful analytical expression for bivariate distribution of properties (e.g., polymer chain chemical composition and molecular weight) for dead polymer chains produced instantaneously. However, he does not address or contemplate the use of such instantaneous property measures to track distribution of polymer properties (such as composition, molecular weight and long chain branching) through polymer reactor networks for modeling/simulation of reactor networks or polymer manufacturing systems.

A. H. Abdel-Alim and A. E. Hamielec in the *J. Applied Polym. Sci.*, 16, 783 (1972) show the use of instantaneous property methods as applied to the batch polymerization of vinyl chloride. This paper was referred to in a text by J. A. Biesenberger and D. H. Sebastian, entitled "Principles of Polymerization Engineering," Wiley-Interscience, New York, (1983) in which instantaneous property methods were discussed.

A. E. Hamielec's research associates and Ph.D. students dominated the use of instantaneous property methods and these applications have all been for single batch polymerization reactors. Some of these publications include:

S. T. Balke and A. E. Hamielec, "Free Radical Polymerization of Methyl Methacrylate to High Conversions," *J. Applied Polym. Sci.*, 17:905 (1973).

L. H. Garcia-Rubio and A. E. Hamielec, "Bulk Polymerization of Acrylonitrile-Model Development," *J. Applied Polym. Sci.*, 23:1413 (1979).

C. J. Kim and A. E. Hamielec, "Polymerization of Acrylamide with Diffusion-Controlled Termination," *Polymer*, 25:845 (1984).

O. Chiantore and A. E. Hamielec, "Thermal Polymerization of p-Methyl Styrene at High Conversions and Temperatures," *Polymer*, 26:608 (1985).

D. Bhattacharya and A. E. Hamielec, "Bulk Thermal Copolymerization of Styrene/p-Methyl Styrene," *Polymer*, 27:611 (1986).

K. M. Jones et al., "An Investigation of the Kinetics of Copolymerization of Methyl Methacrylate/p-Methyl Styrene," *Polymer*, 27: 602 (1986).

T. M. Yaraskavitch et al., "An Investigation of the Kinetics of Copolymerization of p-Methyl Styrene-Acrylonitrile," *Polymer*, 28:489 (1987).

S. Zhu and A. E. Hamielec, "Chain Length Dependent Termination for Free-Radical Polymerization," *Macromolecules*, 22:3093 (1989). This paper is notable for its generalization of the Schulz-Flory and Stockmayer's distributions to account for chain-length dependent termination for free-radical polymerization.

S. Thomas et al., "Free-Radical Polymerization—An Elegant Method of Solving the Population Balance Equations with Chain Transfer to Polymer" *Polymer Reaction Engineering*, 5:183 (1997). This reference is notable for the first attempt to use instantaneous property methods with long chain branching and tracking distributions of molecular weight and long chain branching in a batch reactor.

"Predici" a simulation of polyreaction kinetics product by CiT GmbH is marketed as providing the computation of complete molecular weight distribution of polymers in a process simulator/modeler. This product is an example of the method where population balance equations are solved as differential equations. See "The Simulation of Molecular Weight Distributions in Polyreaction Kinetics by Discrete Galerkin Methods," *Macromol. Theory Simul.*, 5:393–416 (1996).

Thus, to date, process modeling of polymer manufacturing systems remains computationally complex, inaccurate and inefficient or otherwise problematic.

SUMMARY OF THE INVENTION

The present invention overcomes the shortcomings of the prior art. In particular, the present invention does not attempt to solve the population balance equations as ordinary differential equations for polymerizations under transient conditions as is done in the prior art. The prior art solves ordinary differential equations for the population balance equations or for the moments of the distribution functions described by the population balance equations.

The present invention solves the differential form of the population balance equations as a set of algebraic equations to calculate the full distributions of composition, molecular weight, stereoregularity and long chain branching for polymer chains produced "instantaneously" or in a small time interval. This is called the "instantaneous property method," and the polymer chains produced instantaneously are referred to herein as a "pulse" of dead polymer. In addition, the present invention provides novel and efficient methods of tracking the mass and the distribution functions of polymer chains produced "instantaneously" in transient or steady-state polymer manufacturing systems which include reactor networks.

With the "instantaneous property method", the calculated distribution functions for polymer composition, molecular weight, stereoregularity and long chain branching are often analytical expressions with one or two kinetic parameters. The mass of the polymer produced "instantaneously" and its associated one or two kinetic parameters may be readily tracked in a polymer manufacturing system and when desired these kinetic parameters may be used to reconstruct the full distributions of composition, molecular weight, stereoregularity and long chain branching at any point of interest in the transient polymer manufacturing system including the polymer product stream leaving the manufacturing system. This gives no loss of information as with the method of moments and yields high information transfer efficiency.

As such, the present invention provides property distributions of composition, molecular weight, long chain branching, stereoregularity (and other polymer properties), for modeling reactor networks or polymer manufacturing systems, as heretofore unachieved in the prior art. By employing the instantaneous property measurements instead of the moment of distributions of the prior art, the present invention provides accurate and computationally efficient modeling of polymer processes and manufacturing systems for carrying out the same.

As used herein "polymer manufacturing systems" means a system including one or more polymer reactors and ancillary equipment (such as distillation columns/towers, dryers, extruders, etc.).

"Pulse of dead polymer" or a "pulse" refers to the polymer chains produced instantaneously. "Pulses" are generated at the active sites of polymerization catalysts. Some catalysts may possess a number of active sites with different polymerization characteristics. In other words, different types of polymer pulses (i.e., with different molecular properties) can be generated from different types of active sites. These different types of active sites are grouped as "site types".

"Polymer properties" includes chemical and physical properties. More specifically, polymer properties includes (a) molecular properties of polymers (e.g., distributions of composition, molecular weight, long chain branching and stereoregularity), (b) rheological or processing properties of polymers (e.g., zero shear melt viscosity, melt index, melt flow ratio, melt strength), and (c) mechanical properties (e.g., tensile modulus, elastic modulus, impact strength and environment stress cracking).

In the preferred embodiment, the present invention provides a method and apparatus for modeling a polymer manufacturing system. The polymer manufacturing system is formed of plural chemical reactors for carrying out a polymerization process, such as chain growth polymerization. The invention method comprises the steps of:

providing indications of reactor type and polymers involved in the polymerization process, each polymer having at least one molecular property (preferably with a distribution function such as composition, molecular weight, stereoregularity or long chain branching);

calculating or otherwise determining instantaneous molecular property measures of the properties of the polymers (including for example molecular weight, composition, stereoregularity and long chain branching distributions);

for at least one polymer property (e.g., one of composition, molecular weight, stereoregularity, and long chain branching frequency), calculating and tracking the property distributions and mass of the pulse from the calculated instantaneous kinetic parameters and subsequently calculating the full distribution of accumulated polymer of the property at any point in the polymer manufacturing system including the polymer product stream leaving the manufacturing system; and using the calculated property distribution, representing the polymerization process such that the polymer manufacturing system is modeled.

In accordance with one aspect of the preferred embodiment, the end user specifies a reactor type of one or more batch, semi-batch or continuous reactors. For continuous reactors, the preferred embodiment enables user specification of steady state or transient for modeling the same.

Further, the present invention provides tracking of polymer properties throughout a polymer manufacturing system for purposes of simulating the same or a polymer process. The invention tracking of polymer properties enables calculation of full property distributions in the model/simulation. The tracked polymer properties include mass, molecular weight, composition, stereoregularity and long chain branching.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION

By way of background and introduction to the specifics of the present invention, discussed next are the following:
Molecular Property Distribution Types
Distribution Functions
Distributions in Process Models
Average Properties and Moments
Method of Instantaneous Properties
Mechanism for Tracking Distributions
After discussing the foregoing, an example of the present invention method and apparatus for simulating/modeling polymer processes of reactor networks using the method of instantaneous properties (to calculate property distributions) is provided.

Molecular Property Distribution Types:

The common polymer molecular properties for which distributions are typically considered include

- chain size (e.g., molecular weight or chain length)
- co-polymer composition
- degree of branching
- polymer particle size (for certain polymerization reaction types)
- stereoregularity In order to accurately characterize a polymer component, and maintain control of polymer product rheological and mechanical properties, physicists, chemists and engineers must concern themselves with most of these distributions.

From a modeling standpoint, many theoretical and empirical functions have been developed to represent distributions. Theoretical distribution functions are generally analytical solutions of the population balance equations. Some of these are reviewed here. These functions tend to fall into categories derived from their formulation, or from their graphical representation. For example, distributions which consider two dependent parameters simultaneously, e.g., chain size and copolymer composition, are termed "bivariate" distributions. Distributions which mimic the normal bell-shaped graphical representation are called "unimodal" distributions. This is in contrast with distributions which reveal several peaks and are called "bimodal" or "multimodal" distributions.

Distribution Functions:

In the majority of cases, the distribution functions proposed in the literature are based on a statistical approach and use one of three types of mathematical functions: binomial, Poisson and Gaussian. The parameters in these distribution functions can easily be calculated from the polymer average properties (degree of polymerization, polydispersity index, etc.) The following are the common distribution functions which have been applied to the calculation of polymer molecular property distributions.

Schulz-Flory Most Probable—See

Flory, P. J., "Molecular Size Distribution in Linear Condensation Polymers," *J. Am. Chem. Soc.,* 58:1877 (1936).

Flory, P. J., *Principles of Polymer Chemistry*, Cornell University Press, Ithaca, N.Y. (1953).

Schulz, G. V., "Uber die Bezeihung zwischen Reaktionsgeschwindigkeit und Zusammensetzung des Reaktionsproduktes bei Macropolymerisationsvorgängen," *Z.Physik.Chem.,* B30:379 (1935).

Schulz, G. V., "Uber die Kinetik der kettenpolymerisationen. V Der Einfluss verschiedener Reaktionsarten auf die Polymolekularität, *Z. Physik. Chem,* B43:25 (1939).

Schulz (Schulz, 1935/1939)

Weibull-Tung Generalized Exponential—See

Weibull, W., "A Statistical Distribution Function of Wide Applicability, *J. Appl. Mech.,* 18:293 (1951).

Tung, L. H., "Fractionation of Polyethylene, *J. Polymer Sci.,* 20:495 (1956).

Normal—See

Biesenberger, J. A. and Sebastian, D. H., "Principles of Polymerization Engineering," Wiley-Interscience, New York (1983).

Wesslau Logarithmic Normal—See

Wesslau, H., "Die Molekulargewichtsverteilung einiger Niederdruckpolyäthelene," *Makromol. Chem,* 20:111 (1956).

Lansing Logarithmic Normal—See

Lansing, W. D. and Kramer, E. O., "Molecular Weight Analysis of Mixtures by Sedimentation Equilibrium in the Svedberg Ultracentrifuge," *J. Am. Chem. Soc.,* 57:1396 (1935).

Poisson—See

Biesenberger (1983).

Zimm—See

Zimm, B. H., "Apparatus and Methods for Measurement and Interpretation of the Angular Variation of Light Scattering; Preliminary Results on Polystyrene Solutions," *J. Chem. Phys.,* 16:1099 (1948).

Stockmayer Bivariate—See

Stockmayer, W. H., *J. Chem. Phys.,* 13:199 (1945).

In addition to these distribution functions, a method using the moments of distributions is available (Tompa, H., "The Calculation of Mole-Weight Distributions from Kinetic Schemes," Chap. 7 in *Comprehensive Chemical Kinetics,*" Vol. 14A, C. H. Bamford and C. F. H. Tipper, Eds, American Elseview, New York (1976)). Two of these functions have greater importance for the present invention. These are now discussed in more detail.

Schulz-Flory Most Probable Distribution

Schulz and Flory developed a one-parameter equation to represent the distribution of polymers which fall into one of the following categories.

- addition polymers formed by a constant rate of initiation, with invariant monomer concentration, with termination by disproportionation only, and with no chain transfer to monomer
- linear condensation polymers obeying the assumption of equal reactivities of chain ends or linear condensation polymers formed by random interchange of units
- low molecular weight polymer formed from a high molecular weight polymer by random scission The Schulz/Flory distribution is also known as the Most-Probable distribution since it is dictated by the probability of random events, such as the location of a scission reaction on a long-chain molecule. It should be pointed out that the limitation for the use of the Schulz-Flory distribution, i.e., constant rate of initiation with invariant monomer concentration is no longer in effect when this distribution function is used with the "instantaneous property method" of the present invention. The number or mole-fraction distribution and the weight fraction distribution are given by $F(r) = p^{r-1}(1-p)$ for number distribution, and $W(r) = rp^{r-1}(1-p)^2$ for weight distribution where p is the extent of reaction with r being the size of the molecule or number of segments; for addition polymerizations p is the probability that a growing live polymer molecule will propagate. For step-growth reactions, p is the fractional conversion of monomer end groups.

From these distributions, the number average (n), weight average (w) and z average (z) degree of polymerization (DP), and the polydiperisty index (PDI) are $$DP_n = \frac{1}{(1-p)}$$

-continued $$DP_w = \frac{(1+p)}{(1-p)}$$

$$DP_z = \frac{(1+4p+p^2)}{(1-p)(1+p)}$$

PDI=1+p

To generate the distribution, p is calculated from degree of polymerization (DP) as $$p = 1 - \frac{1}{DP_n}$$

Note that as p goes to 1, PDI goes to 2.

Stockmayer Bivariate Distribution

There are cases where two polymer property distributions must be considered simultaneously. Functions which consider two properties simultaneously are called bivariate. Stockmayer solved the population balance equations and developed such a distribution function to consider both chain size and composition distribution for example (Stockmayer, 1945). This model may be extended to other combinations of polymer properties such as chain size and long chain branching distribution for the case of copolymers.

Distributions in Process Models:

In order to track property distributions within the framework of a process simulation package (computer program), one approach would be to implement one of the distribution functions discussed earlier, and store the calculated values for the distributions throughout the simulation. This approach would require large amounts of data storage and would take unreasonably long CPU times. For this reason, only average polymer properties were tracked in prior art process modeling software.

There is however, a great demand to know the full molecular weight distribution, particularly for complex distributions that may have a shoulder, or are even bimodal. This information is needed for the purposes of optimization of rheological and mechanical properties of the final polymer product.

Within the present invention method and apparatus of process modeling, a dual approach for determining polymer properties is used. The method of moments continues to be the preferred approach for calculating average properties, while the method of instantaneous properties is used to calculate property distributions (e.g., molecular weight distribution, composition distribution and long chain branching distribution, and the like). The present invention method addresses the issue of data storage and computational complexity in tracking distributions. Under special circumstances, the most general form of the instantaneous distribution function reduces to Flory's most probable distribution. The instantaneous distribution functions are unimodal. However, the distribution functions for polymer accumulated in a multi-reactor system may be multimodal.

Average Properties and Moments

It is usually very convenient to examine polymer molecular properties in terms of averages instead of considering the complete distribution. These average properties must be determined from the actual distributions either through distribution moments or through instantaneous properties.

The average properties tracked for polymers are calculated using the method of moments within kinetic models, as in the prior art.

For a given property s, the property distribution may be described by a frequency function $f_s$ when the property is a discrete variable, and by a density function $f(s)$ when the property s is continuous. Therefore, $f_s$ and $f(s)$ represent the portion (e.g., number, weight, volume, fraction) of the population whose property is exactly s (discrete) or whose property lies between s and s+ds. The frequency and density distribution functions are respectively $$F_s = \sum_{s_0}^{s} f_s$$

and $$F(S) = \int_{s_0}^{s} f(s)ds$$

with $s_0$ being the initial value of s, and S an arbitrary higher value (Biesenberger, 1983).

Distribution moments may be defined from the origin of the average property, i.e., property is equal to 0, or from the mean value of that property. The moments employed in the preferred embodiment use the first approach. In this case, the generalized form of the relationship between distribution moment and distribution function is as shown in the following equation.

$$\mu_k \equiv \begin{cases} \sum_{all\ s} s^k f_s & \text{for the frequency function} \\ \int_{all\ s} s^k f(s)ds & \text{for the density function} \end{cases}$$

where $\mu$ is the moment;

k is the moment order (e.g., 0–3 for zeroth through third moment);

s is the property value (e.g., chain length, molecular weight, particle size, etc.);

$f_s$ is the frequency function; and $f(s)$ is the density function.

The average properties are calculated as ratios of the moments. Number average is the ratio of first to zeroth moment, $\mu_1/\mu_0$. Weight or Volume average is the ratio of second to first moment, $\mu_2/\mu_1$. Z-average is the ratio of third to second moment, $\mu_3/\mu_2$.

For the case of chain length distribution the moments may be calculated using $$\lambda_m = \Sigma n^m Q_n$$

where $\lambda$ is the moment;

m is the moment order;

n is the chain length or degree of polymerization; and $Q_n$ is the number of moles of polymer of length n (when $Q_n$ is normalized, the moments $\lambda$ and $\mu$ are the same).

The average chain length properties are then

DPn=$\lambda_1/\lambda_0$

DPw=$\lambda_2/\lambda_1$

DPz=$\lambda_3/\lambda_2$

PDI=$\lambda_2/\lambda_0$

A similar definition of moments for the frequency distribution is applied to molecular weight. In the present invention, it is applied to chain length, then the average molecular weight values are determined using the average degree of polymerization and average segment molecular weight.

Method of Instantaneous Properties

The present invention is directed to polymer processes involving chain growth polymerization (other than true living), for any active center type (radical, anionic, cationic, Ziegler-Natta, metallocene (coordination and otherwise)), for any process type (solution, slurry, gas phase, suspension, emulsion, etc.), for any reactor operation type (batch, semi-batch, continuous), for any reactor type (CSTR, PFTR and combinations thereof). Briefly, pulses of dead polymer are continuously generated in the polymerizing mass. These pulses have a mass and molecular properties (such as distributions of composition, molecular weight, long chain branching and stereoregularity, etc.). The present invention instantaneous property method uses this information and provides effective methodologies (with high information transfer efficiency) for (1) calculation of the distributions of composition, molecular weight, long chain branching and stereoregularity, for the dead polymer in each pulse; and (2) tracking the mass and distributions of each pulse of polymer through the transient and steady-state manufacturing system (which includes polymer reactors and ancillary equipment (distillation towers, dryers, extruders, and the like).

Applying the method of moments for the calculation of property distributions has several drawbacks as previously mentioned. In addition to CPU requirements and computational complexity, a larger number of moments than currently calculated in process modeling programs/systems would be required. A knowledge of even a larger number of moments of a distribution does not permit one to unambiguously construct a complex distribution. One must therefore look beyond the method of moments for a more powerful method to predict these complex distributions for a polymer manufacturing system.

A better approach for generating distributions (of molecular weight, composition, stereoregularity or long chain branching) consists of (i) calculating or using existing distribution functions which are valid solutions of the population balance equations (such as the Schulz-Flory molecular weight distribution or the Stockmayer bivariate distribution of composition and molecular weight) for polymer chains produced "instantaneously", (ii) storing the kinetic parameters of these distributions throughout the simulation calculations for the network of equipment used for polymer manufacture (polymer reactors, reactive extruder, separators, etc.), and (iii) later using these kinetic parameters and their associated distribution functions and polymer mass or polymer mass production rates to construct the full distribution (composition, molecular weight, stereoregularity, long chain branching) of polymer accumulated in the reactor system. Such an approach has its beginnings in Hamielec, A. E., "Polymerization Processes," *Ullmann's Encyclopedia of Industrial Chemistry*, 5th ed. Vol. 21, pp. 324–330 (1992).

In the simplest case, linear polymerization in a single CSTR reactor, the ratios of termination and chain transfer reaction rates to propagation reaction rates are stored. The instantaneous chain length distribution is expressed as a function of these ratios and chain length. For the case of two CSTRs in series, at steady-state, the product polymer weight chain length distribution function is the weighted average of the distribution function in each CSTR taken separately. The case of a plug flow reactor may be approximated using multiple CSTR's, and similarly for a batch reactor.

By looking at the treatment of such reactor configurations, applicants deduce that the final polymer distribution is a result of the entire system of reactors. For this reason, the molecular weight distribution (MWD) modeling implementation in the present invention takes into consideration the proper data structure to track distribution parameters at every point in a process flowsheet. Users are able to request MWD from any point in the flow sheet, and from this point the present invention software flowsheet connectivity information may be used to track polymerization history. The solution of the population balance equations to generate distribution functions for polymer chains produced "instantaneously" will now be described in detail.

The calculation of chain length distribution for a batch reactor from reaction rate parameters for linear addition polymerization was described by Hamielec (Hamielec, 1992). Consider the equations for the generation and consumption of free radicals. A similar approach may be used for other active centers (Ziegler-Natta, metallocene, etc.)

$$[R_I^0] = \frac{R_I + K_{fm}[M][R^0] + K_{fT}[T][R^0]}{K_p[M] + K_{fm}[M] + K_{fT}[T] + (K_{tc} + K_{td})[R^0]} \quad \text{Equation 1.1}$$

$$[R_r^0] = \frac{K_p[M][R_{r-1}^0]}{K_p[M] + K_{fm}[M] + K_{fT}[T] + (K_{tc} + K_{td})[R^0]} \quad \text{Equation 1.2}$$

where $[R_I] = 2K_d[I]$ is the initiation rate.

Let us introduce two dimensionless parameters $\tau$ and $\beta$.

$$\tau = \frac{R_{td} + R_f}{R_p} = \frac{K_{td}[R^0] + K_{fm}[M] + K_{fT}[T]}{K_p[M]} \quad \text{Equation 1.3}$$

$$\beta = \frac{R_{tc}}{R_p} = \frac{K_{tc}[R^0]}{K_p[M]} \quad \text{Equation 1.4}$$

where $R_p = K_p[R^0][M]$ is the propagation rate;

$R_{td} = K_{td}[R^0]^2$ is the rate of termination by disproportionation;

$R_{tc} = K_{tc}[R^0]^2$ is the rate of termination by combination; and $R_f = K_{fm}[R^0][M] + K_{fT}[R^0][T]$ is the total rate of all chain transfer reactions.

If we assume that the stationary-state hypothesis holds, then the initiation rate is equal to the sum of the termination rates, $R_I = R_{td} + R_{tc}$.

The equations for the rate of generation and consumption of radicals are written as follows:

$$[R_I^0] = \frac{\tau + \beta}{1 + \tau + \beta}[R^0] \quad \text{Equation 1.5}$$

$$[R_r^0] = \frac{1}{1 + \tau + \beta}[R_{r-1}^0] \quad \text{Equation 1.6}$$

Therefore $$[R_r^0] = [R^0](\tau + \beta)\Phi^r \quad \text{Equation 1.7}$$

where $$\Phi = \frac{1}{1 + \tau + \beta} \quad \text{Equation 1.8}$$

The rate of production of polymer molecules of chain length r, $R_{F_p}(r)$ is given by the following equation.

$$R_{FP}(r) = \frac{1}{V}\frac{d(V[P_r])}{dt}$$ Equation 1.9

$$= (K_{fm}[M] + K_{fT}[T] + K_{td}[R^0])[R_r^0] +$$

$$\frac{1}{2}K_{tc}\sum_{s=1}^{r-1}[R_s^0][R_{r-s}^0]$$

Substituting $[R_r^0]$ from Equation 1.7 in Equation 1.9 gives $$R_{FP}(r) = K_p[R^0][M](\tau+\beta)\left\{\tau + \frac{\beta}{2}(\tau+\beta)(r-1)\right\}\Phi^r$$ Equation 1.10

Therefore, the instantaneous weight chain length distribution may be calculated from rate of production of polymer molecules as follows.

$$W(r) = \frac{rR_{FP}(r)}{\sum_{r=1}^{\infty}rR_{FP}(r)}$$ Equation 1.11

$$= \frac{(\tau+\beta)\left\{\tau+\frac{\beta}{2}(\tau+\beta)(r-1)\right\}r\Phi^r}{1+\tau+\beta}$$

$$= (\tau+\beta)\left\{\tau+\frac{\beta}{2}(\tau+\beta)(r-1)\right\}r\Phi^{r+1}$$

In other words, $W(r)$ is the weight chain length distribution of dead polymer chains produced in a small time interval t to t+dt, in a batch reactor. $W(r)$ is also the weight chain length distribution of dead polymer chains produced in a CSTR operating at steady-state.

If $\beta \ll \tau$, which is the case when the polymer chains are formed by chain transfer or by termination by disproportionation, this equation reduces to $$W(r) = \tau^2 r\Phi^{r+1} = r\left(\frac{1}{1+\tau}\right)^{r-1}\left(\frac{\tau}{1+\tau}\right)^2$$ Equation 1.12

In this equation, $1/(1+\tau)$ is the probability of growth for a polymer radical, and $\tau/(1+\tau)$ is the probability that a polymer radical stops growing. Since r is usually large, $W(r)$ in Equation 1.11 can be approximated as a continuous function with small error.

$$W(r) \approx (\tau+\beta)\left\{\tau+\frac{\beta}{2}(\tau+\beta)(r-1)\right\}r\cdot\exp\{-(\tau+\beta)r\}$$ Equation 1.13

For most free-radical polymerizations $(\tau+\beta) \ll 1$ and is of the order $10^{-6}$ to $10^{-2}$.

The weight-average chain length for polymer produced instantaneously is given by $$P_w = \sum_{r+1}^{\infty}rW(r)$$ Equation 1.14

$$= \frac{\tau(2+\tau+\beta)+\beta(3+\tau+\beta)}{(\tau+\beta)^2}$$

$$\approx \frac{2\tau+3\beta}{(\tau+\beta)^2}$$

The instantaneous number-average chain length is given by $$Pn = \frac{1}{\sum_{r=1}^{\infty}\frac{W(r)}{r}}\frac{(1+\tau+\beta)}{(\tau+\beta/2)} \approx \frac{1}{(\tau+\beta/2)}$$ Equation 1.15

The polydispersity index for polymer produced instantaneously is given by $$PDI = \frac{P_w}{P_n} \approx \frac{(2\tau+3\beta)(\tau+\beta/2)}{(\tau+\beta)^2}$$ Equation 1.16

Equation (1.13) applies to both homo and copolymerization with two or more monomer types. When chain growth polymerizations are done with active center types other than radicals (Ziegler-Natta, metallocene, etc.) $\beta=0$ in Equation (1.13), and the instantaneous chain length distribution becomes a single parameter $\tau$ distribution, which is in fact Flory's most probable distribution with a polydispersity index of 2.0.

Equation (1.13) is the main expression used in the preferred embodiment to generate chain length distribution of linear homopolymer and copolymer chains. Within the context of a polymerization reactor, this expression is valid for the case of linear chains of a homopolymer or copolymer produced in a single CSTR at steady-state. For the case of two CSTR's in series, the end product polymer distribution is a composite which is a weighted average of the distributions of polymer produced in the first and the second reactor.

$$W_{out}(r) = \frac{m_1}{m}*W_1(r) + \frac{m_2}{m}*W_2(r)$$ Equation 1.17 where $m=m_1+m_2$ is the total mass of polymer produced in the first and the second reactor per unit time. The distribution function in each reactor is given by Equation (1.13) with the $\tau$ and $\beta$, varying from reactor 1 to reactor 2, and independent of time under steady-state operation.

In the present invention, a plug flow reactor is divided into several volume elements and treated as a series of CSTR's. The $\tau$, $\beta$, and polymer mass production rate values are stored for each volume element and later used for the calculation of the composite chain length distribution function. A batch reactor is handled using a similar approach. In this case, the $\tau$, $\beta$, and polymer mass values are stored for each time increment.

For linear chains of a copolymer, the difference from the homopolymer case is only in the calculation of the reaction rates for propagation, termination, and transfer reactions, $R_p$, $R_{tc}$, $R_{td}$, and $R_{fm}$.

Mechanism for Tracking Distributions:

In the present invention, the method of instantaneous properties is used to generate chain length and other property distributions in contrast to the prior art method of moments of distributions used to generate average properties of the polymer. The present invention method is applied at two levels:

the reactor level for determining the mass or mass production rate and distribution (composition, molecular weight, stereoregularity and/or long chain branching) of polymer newly produced within the vessel (local distribution), and the flowstream level for determining how the mass of polymer produced "instantaneously" in a reactor upstream is distributed in streams downstream at some later time and to what extent the distribution of polymer molecular properties (composition, molecular weight, stereoregularity and long chain branching) is distorted due to physical and chemical changes downstream (cumulative distribution).

Within polymer reactors, the present invention method of instantaneous properties is used directly to determine the distribution of newly produced polymer. As kinetic calculations are being performed, the values for the instantaneous kinetic parameters $\tau$ and $\beta$, as calculated using Equations 1.3 and 1.4 respectively within the kinetic model, are saved for later calculations of the distribution. In addition, the polymer mass or polymer mass of production rate corresponding to these values is saved.

For a CSTR reactor operating at steady-state, a single value of $\tau$ and $\beta$ is needed. For a plug-flow or batch reactor, a value of $\tau$ and $\beta$ is needed at every profile point. In the case of the plug-flow reactor, the profile points represent equal-sized axial sections along the reactor length. In the case of the batch reactor, profile points are stored in fixed time intervals.

To calculate the distribution of polymer produced at the exit of the reactor, Equation 1.13 is applied with the calculated $\tau$ and $\beta$ for the CSTR reactor. For a plug-flow or batch reactor each profile element is represented as a CSTR for which that same equation is applied. To determine the distribution at the exit of these reactors, Equation 1.17 is applied to the total number of profile elements. This local distribution obtained is combined with distribution from the reactor inlet, where applicable and using Equation 1.17, then transferred through the outlet to downstream unit operations. In the preferred embodiment, the distribution is available to the end user both as a data table and as a graphic plot.

For multi-site kinetic models, such as required for Ziegler-Natta catalysts, an additional dimension is introduced. The $\tau$ and $\beta$ parameters are stored for each site type. Therefore, the number of parameters for the case of a CSTR will be the user-specified total number of site types. The distribution produced on each site type is calculated using Equation 1.13, then Equation 1.17 is appropriately modified to account for multi-site types (as discussed later) to calculate the composite polymer distribution. This procedure is applied once more to represent plug-flow and batch reactors as multiple CSTR reactors.

It is noted that in the preferred embodiment, in any given reactor, the complete flowsheet connectivity is not needed in order to calculate the distribution of accumulated polymer. Each inlet stream has associated with it the distribution of accumulated polymer up to that point in the flowsheet.

Distributions in Process Streams

The polymer distribution calculated within polymer reactors is transferred into the outlet stream. This allows flow-sheeting of the cumulative distribution, i.e., the data follows the polymer component throughout the flowsheet. The cumulative distribution is stored within the stream as a Property Set or PROP-SET in the preferred embodiment. In the preferred embodiment, the process modeling software provides several different vehicles for associating data with process streams. The first is the stream vector which contains composition and state information. Also there are component attributes which are employed in the preferred embodiment. Another vehicle is the PROP-SET.

One basic difference between PROP-SETS and the other two categories of stream data structures is the fact that the latter are processed during convergence calculations while PROP-SETS are not. If distributions were processed during convergence, there would be a significant computing penalty due to the large amount of data they introduce. The information used for calculating the distributions is derived from converged quantities. Thus, there is no need for applying convergence calculations to the distribution data itself.

Another difference is the fact that PROP-SETS are not part of the default stream structure available to model analysis tools. End-users often access the standard stream structure either through model analysis tools or in code in user FORTRAN subroutines. The instantaneous polymer distribution data needs to be accessed differently than other stream data. In the preferred embodiment, this polymer distribution data is carried in non-accessible storage space or similar memory.

Figure 2:
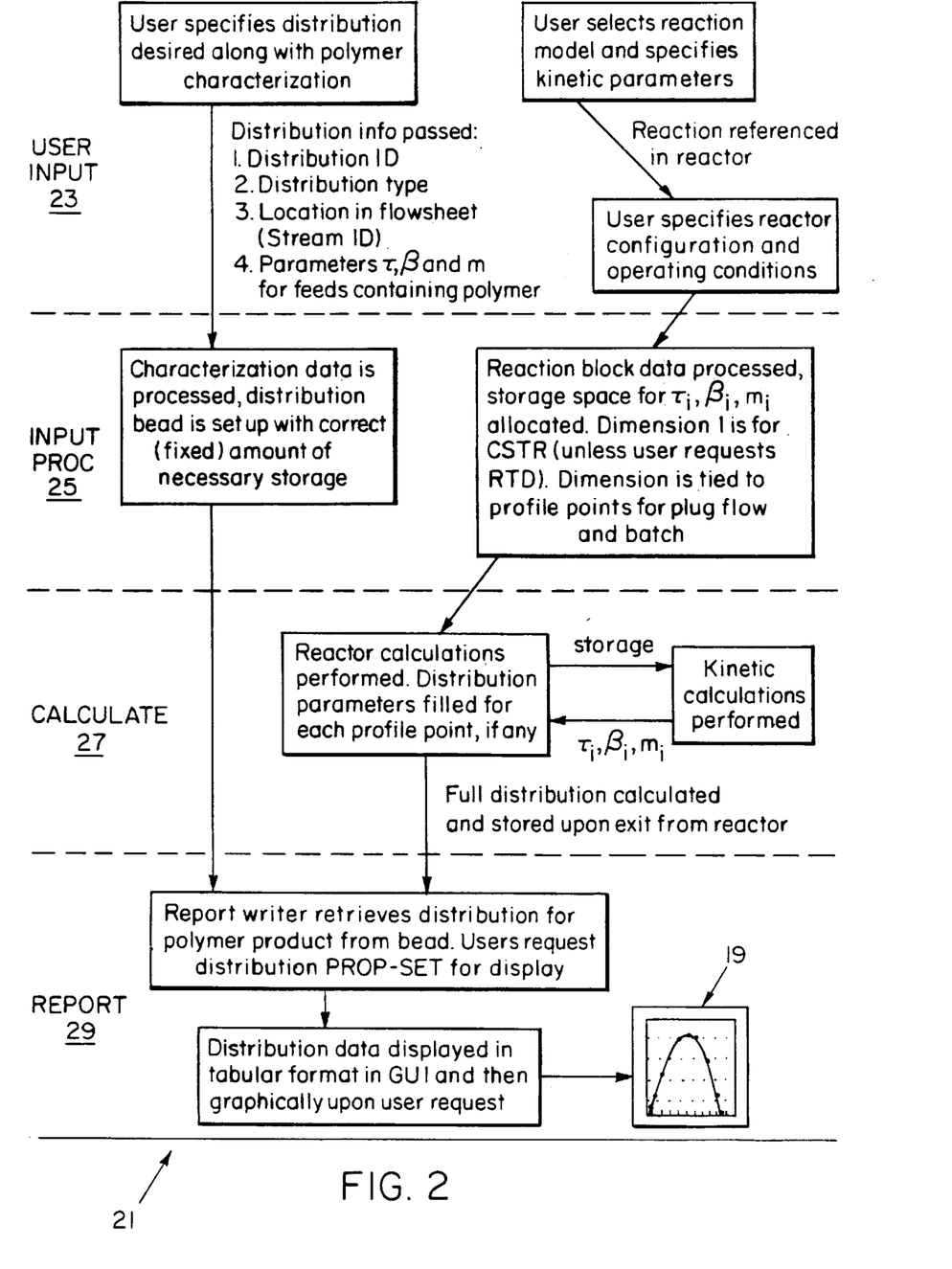
FIG. 2 is a flow diagram of the software routine implementing a preferred embodiment of the present invention.

FIG. 2 illustrates the procedure followed to generate the property distributions, for steady-state operation, in the present invention.

Referring to FIG. 2, the preferred embodiment software procedure 21 begins with user input step 23. A user interface supports user input step 23 and prompts the end-user to enter indications describing (i) the polymer property distribution desired (e.g., molecular weight distribution, composition distribution, long chain branching, stereoregularity and the like), (ii) the subject chemical process/reaction desired to be simulated (including reaction model and specific kinetic parameters), and (iii) the subject manufacturing system including a network of reactors (e.g., one or more kinetic reactors: CSTR, plug-flow, or other reactors, operating in batch, semi-batch or continuous operation, and the like). In particular, for the subject reactor network, the end-user is prompted to specify reactor configuration and operating conditions. In response, procedure 21 initializes a flow sheet which maps product flow and reactor configuration.

Further in response to the indications entered by the end-user in step 23, procedure 21 generates data elements to provide working distribution information to subsequent steps. Specifically, procedure 21 generates (i) a distribution identifier, (ii) a flag or other indicator for indicating distribution type, (iii) a locator (referred to as a stream identifier) indicating location in the flow sheet, and (iv) parameters $\tau$, $\beta$ and m for feed streams containing polymers. These data elements are passed to an input processing step 25.

Input processing step 25 receives and is responsive to the passed data elements. In particular, input processing step 25 processes distribution characterization data and sets up a distribution bead or vector for storing distribution data. Included in the distribution bead set up, the input processing step 25 initializes an appropriate, fixed amount of storage (memory). Further in response to the reactor and reaction specifications given by the end-user in input step 23, input processing step 25 initializes a reaction data block. This includes allocating in the reaction data block space for each set of $\tau_i$, $\beta_i$ and $m_i$. A dimension parameter is set to 1 for CSTR unless the end-user requests residence time distribution in step 23. Input processing step 25 ties the dimension parameter to profile points for plug flow and batch reactors.

Next, calculation step 27 performs reactor calculations using the equations previously discussed. The results of each calculation are stored in the reaction data block. Also kinetic calculations are performed on the stored data. $\tau_i$, $\beta_i$ and $m_i$ result, and for each i (each set), $\tau_i$, $\beta_i$ and $m_i$ are associated with a respective profile point. Other distribution parameters are also associated with respective profile points. The association of the various distribution parameters per profile point enable or effect calculation of the full distribution of target properties at the end of the reaction. After calculating full property distributions, calculation step 27 stores the same in the distribution bead upon exit from the reactor.

A report generator 29 is coupled to receive characterization data from input processing step 25 and the full property distributions as calculated by calculation step 27. More accurately, report generator 29 retrieves from the distribution bead, the property distributions for the polymer product and therefrom provides display of distributions of property sets (e.g., molecular weight distributions, composition distributions and the like) to the end-user upon user request. Also the report generator 29 enables distribution data to be displayed in tabular format and/or graphically upon user request. Using graphic technology common in the art, reporter 29 cooperates with a graphical user interface which enables end-user interaction with the various displays (e.g., from tables to graphs, etc.) as viewed on a monitor 19.

Accordingly, procedure 21 provides modeling of polymer reactions in reactor networks by tracking instantaneous property measures (reaction rates) and hence instantaneous property distributions throughout the reactor network and by calculating full property distributions upon exit of the reactor network.

Figure 3:
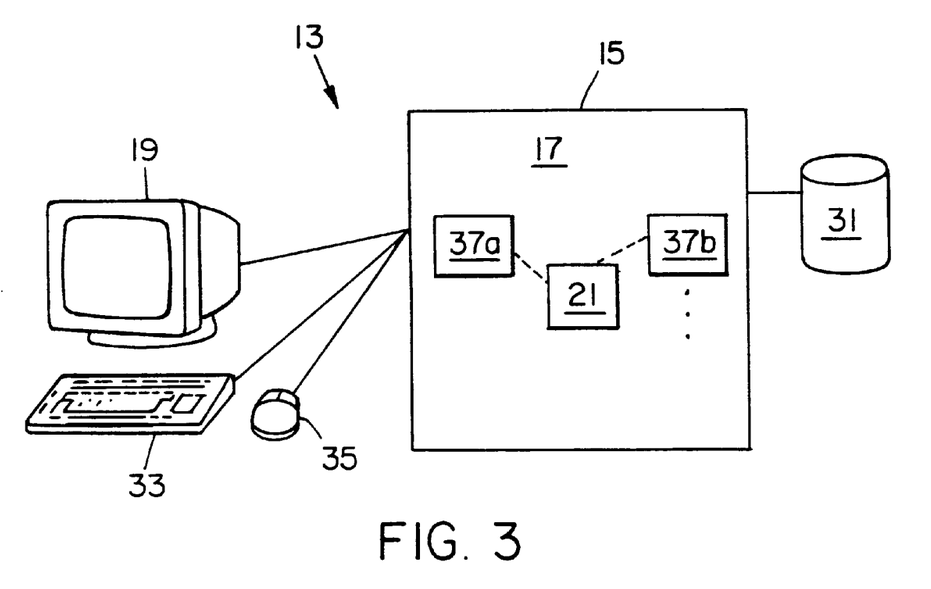
FIG. 3 is a block diagram of a computer system employing the software routine of FIG. 2.

It is understood that the foregoing software procedure/routine 21 is executed in a digital processor of a computer system, such as that illustrated in FIG. 3. Briefly, computer system 13 is formed of (a) a digital processor 15 with accompanying working memory 17, disk memory 31 and the like, and (b) I/O peripherals common in the art including, but not limited to, a viewing monitor 19, keyboard 33 and mouse 35. Also digital processor 15 may be a node or server in a network of computers and is, for example, of the Intel xx486 processing capabilities or better.

Preferably routine 21 is executed in working memory 17 of digital processor 15 with user input being received from I/O peripherals 33, 35 and visual output being provided on monitor 19. In the preferred embodiment, routine 21 is part of a multiplicity of cooperating (or compatible) software modules 37 for modeling/simulating, monitoring and otherwise analyzing reactor systems (including reactor networks and chemical processes/reactions carried out on the reactor network). Examples of such software modules are Aspen Plus and Speedup (both products of assignee of the present invention). To the extent necessary for understanding the present invention, these or similar additional software modules are disclosed in U.S. Pat. Nos. 5,008,810 and 5,666,297 herein incorporated by reference.

It is understood that other computer configurations and other software modules/architecture are suitable and in the purview of one skilled in the art. For example, a database of reactor system information/data may be involved. The database may reside locally in memory 17 or off disk 31 or the like. The various software modules 37, 21 may share the database information for respective processing. The foregoing description in FIGS. 2 and 3 are for purposes of illustration and not limitation of the present invention.

Restating the foregoing, the present invention introduces novel modeling methods and apparatus for steady-state and dynamic polymer reactor simulations, which have high information transfer efficiencies and permit the efficient calculation of the full distributions of composition, molecular weight and long chain branching, for linear and branched homo and copolymers having any number of branch points and distinct monomer types. These novel modeling methods/apparatus are next illustrated using examples of chain-growth polymerization involving free-radical polymerization and coordination polymerization with catalyst systems (Ziegler-Natta and metallocene catalyst systems, for example) having single and multiple active site types.

To illustrate the present invention methodology of efficiently tracking (high efficiency of information transfer) distributions of composition, molecular weight and long chain branching through transient and steady-state polymer reactor networks, consider a polymerization reactor which is well agitated so that spatial variations in temperature and concentrations of reactants and products are negligible. For solution or bulk polymerizations, this implies that temperature and concentrations of reactants and products dissolved in a single phase are spatially uniform throughout the reacting mass in the reactor. Of course, volatile solvents, reactants and small molecule by-products may partition in the gaseous headspace of the reactor, but this partitioning can easily be accounted for. For emulsion, suspension, dispersion and gas phase slurry polymerization processes, spatial uniformity of concentrations of reactants, solvents, polymer product and others is more difficult to define.

Now during polymerization, reactions may take place in more than one phase and there is clearly a discontinuity in concentrations at the interface of phases. For example, in emulsion polymerization for a well-mixed reactor, concentrations in the aqueous phase are considered spatially uniform. However, in the polymer phase (or in the polymer particles) a smaller particle may contain fewer radicals that a larger polymer particle and the distributions of composition, molecular weight and long chain branching of the polymer in these two sized particles may differ significantly. Applicants therefore define well-mixed for multiphase polymerizations in the following manner.

Choose a volume element, containing a large number of polymer particles, which is much smaller than the total volume of the reacting mass (volume of all phases, in the reactor). The polymer particles are coagulated in the volume element and are mixed and analyzed as a whole. If the distributions of composition, molecular weight and long chain branching are essentially the same for all volume elements, Applicants then consider the contents of the reactor to be well-mixed. This well-mixed or well-agitated reactor can be operated in batch, semi-batch and continuous mode. Batch and semi-batch operations are inherently transient while continuous operation may be steady-state as well as transient.

Batch and Semi-Batch Operation

The present invention methodology is first described qualitatively, introducing certain fundamental ideas. A batch and semi-batch operation under the present invention methodology are considered together and are followed by a consideration of the transient continuous operation.

Consider, for example, a well-mixed polymer reactor operating as a batch or semi-batch reactor. When in semi-batch operation, small molecule ingredients are added to the reactor over time with some time-varying feed rate. With batch operation, all of the small molecule ingredients and possibly some polymer heel is added to the reactor at time $t=0$ over a small time interval. The temperature of the polymerizing mass in the reactor may vary over the total polymerization time $t_F$. From time $t=0$ to $t=t_F$ (total polymerization time), dead polymer chains with distributions of composition, molecular weight and long chain branching are produced continuously. The rate of dead polymer production and the distributions of composition, molecular weight and long chain branching may all vary with time for dead polymer produced instantaneously (i.e., dead polymer chains produced in a "small" time interval, much smaller than the total polymerization time) as well as for dead polymer accumulated over the time interval, $0 < t \leq t_F$, where t represents some time during the time interval, 0 to $t_F$ where $t_F$ is the total polymerization time.

Let us now introduce some additional symbols:

| | |
|---|---|
| $W(\bar{t},\bar{t}) =$ | weight of dead polymer produced (or born) at time $t = \bar{t}$ in a small time interval $\Delta t$, where $\bar{t}$ is the birthtime of "instantaneous" dead polymer, with $\bar{t} \leq t$. |
| $W(t,\bar{t}) \leq$ | $W(\bar{t},\bar{t})$ in general, and is at a time later than $\bar{t}$. However, if there are no long chain branching reactions (e.g., chain transfer to polymer, terminal branching or addition to pendant double bonds), then $W(t,\bar{t}) = W(\bar{t},\bar{t})$ and thus the weight of instantaneous dead polymer and its distributions of composition and molecular weight remain constant in the time interval, 0 to $t_F$. However, because the weight and distributions of composition and molecular weight of instantaneous dead linear polymer chains may change with birthtime, $\bar{t}$, the distributions of composition and mass for the accumulated dead polymer (accumulated in the time interval, 0 to t) may change with time t. |
| $W(r, i, t, \bar{t})$ | is the weight chain length distribution of instantaneous dead polymer born at time $\bar{t}$ at present time t with a chain length r, and having i long chain branches per polymer molecule. So r is the number of monomer units and i is an integer in the set {1,2, . . . 50} with different number of long chain branches per molecule defining a family of branched chains. For the case of linear chains with no long chain branching reactions, $i = 0$ and |
| $W(r, 0, t, \bar{t})$ | $= W(r, 0, \bar{t}, \bar{t})$ which means that the chain length distribution of dead polymer born at time $\bar{t}$ does not change with time t. |

However, it should be mentioned that $W(r, 0 \bar{t}, \bar{t})$ may change with birthtime $\bar{t}$, as variables such as temperature and concentrations of reactants, may in general change with time.

The weight chain length distribution of the dead polymer accumulated in the time interval 0 to t is given by $$W(r, 0, t) = \frac{1}{W_p} \int_o^{W_p} W(r, 0, \bar{t}, \bar{t}) d W_p \quad \text{Equation A1}$$

$$= \frac{1}{W_p} \int_o^{t} W(r, 0, \bar{t}, \bar{t}) R_p(\bar{t}) V(\bar{t}) MW d\bar{t}$$

where $W_p$ is the mass of dead polymer accumulated in the time interval, 0 to t, and $dw_p$ is the mass of instantaneous dead polymer produced in the time interval, $\bar{t}$ to $\bar{t}+dt$. Where $W(r, 0, \bar{t}, \bar{t})$ is the weight fraction of polymer with chain length r produced at time $\bar{t}$. $R_p(\bar{t})$ is the rate of propagation at time $\bar{t}$. $V(\bar{t})$ is the volume of the polymerizing mass at time $\bar{t}$, and MW is molecular weight of the monomer repeat unit $W(r, 0, \bar{t}, \bar{t})$ may be derived analytically, using the differential form of the population balance equations for dead polymer and the algebraic form of the population balance equations for live polymer after application of the stationary-state hypothesis (See Archie E. Hamielec and Hidetaka Tobita, "Polymerization Processes," pp. 324–326, Ullmann's Encyclopedia of Industrial Chemistry, Vol. A21, VCH Publishers, Inc. (1992)).

Equation A1 may be written in the form of an ordinary differential equation if desired, as follows:

$$\frac{d\{W_p * W(r, 0, t)\}}{d W_p} = W(r, 0, \bar{t}, \bar{t})$$

and in a batch reactor $$\frac{d W_p}{d t} = MW * K_p * M * Y_0 * V$$

Therefore, $$\frac{d\{W_p * W(r, 0, t)\}}{d t} = MW * K_p * M * Y_0 * V * W(r, 0, \bar{t}, \bar{t})$$

where
  $K_p$ is the propagation constant;
  M is the concentration of monomer;
  $Y_0$ is the concentration of polymeric radicals; and
  V is the volume of the polymerizing mass.

Thus the weight chain length distribution of dead polymers produced instantaneously is $$W(r, 0, \bar{t}, \bar{t}) = (\tau(\bar{t}) + \beta(\bar{t}))\left\{\tau(\bar{t}) + \frac{\beta(\bar{t})}{2}(\tau(\bar{t}) + \beta(\bar{t}))(r-1)\right\} r * \quad \text{Equation A}$$

$$\exp\{-(\tau(\bar{t}) + \beta(\bar{t}))r\}$$

where the two dimensionless parameters, $\tau(\bar{t})$ and $\beta(\bar{t})$, which in general depend on birthtime $\bar{t}$ of the instantaneous dead polymer, are given by:
Free-radical polymerization $$\tau(\bar{t}) = (R_{trm} + R_{trCTA} + R_{trs} + R_{td})/R_p$$

$$\beta(\bar{t}) = R_{tc}/R_p$$

where
  $R_{trm}$ is the rate of chain transfer to monomer;
  $R_{trcta}$ is the rate of chain transfer to chain transfer agent (CTA);
  $R_{trs}$ is the rate of chain transfer to solvent;
  $R_{td}$ is the rate of termination by disproportionation;
  $R_{tc}$ is the rate of termination by combination; and
  $R_p$ is the rate of propagation.
All of these rates may vary with time. These rates are readily available in existing software involving free-radical polymerization.
Polymerization Using Coordination Catalyst Systems These coordination catalyst systems may be single-site type or multiple-site type. Applicants treat these separately as follows:
  Single-site type catalyst systems
  For these systems $\beta(\bar{t})=0$, and $\tau(\bar{t})$ is given by $$\tau(\bar{t}) = (R_\beta + R_{trm} + R_{trH2} + R_{deac})/Rp$$

where
  $R_\beta$ is the rate of β-hybride elimination;
  $R_{trH2}$ is the rate of chain transfer to hydrogen; and
  $R_{deac}$ is the rate of deactivation.
  Again, these rates are readily available in software for polymerization using coordination catalyst systems and $W(r, 0,\bar{t},\bar{t})=\tau(\bar{t})^2 r*\exp(-\tau(\bar{t})r)$ or Flory's most-probable distribution. The weight chain length distribution of the accumulated dead polymer may be calculated as discussed above in Equation A1 with free-radical polymerization.

Multiple-site type catalyst systems

To apply the novel methodology to multi-site type catalysts, one must characterize the catalyst systems using polymerization followed by polymer characterization (GPC and TREF) followed by deconvolution (See Archie E. Hamielec and João B. P. Soares, "Polymerization Reaction Engineering—Metallocene Catalysts," *Prog. Polym. Sci.*, Vol. 21, pp. 651–706 (1966)). This will provide the relative propagation rates for the different site types as well as the values of $\tau(\bar{t})$ for each site type. The instantaneous weight-chain length distribution for a multi-site type catalyst system is given by $$W(r, 0, \bar{t}, t) = \sum_{j=1}^{N} W_j(\bar{t}) \tau_j^2(\bar{t}) r \exp(-\tau_j(\bar{t}) r)$$

where N is the number of site types j and $W_j(\bar{t})$ is the weight fraction of polymer produced on site type j at birthtime $\bar{t}$. The calculation of the weight chain length distribution of the polymer accumulated in the time interval 0 to t is as stated above for free-radical polymerization in Equation A1.

Treatment of copolymerization.

For copolymerizations with two or more monomer types, the population balance equations may be reduced to those for a homopolymerization with the introduction of appropriate pseudo-kinetic rate constants (refer to H. Tobita and A. E. Hamielec, Polymer 32, 2641 (1991)). In other words, Equation (A) the instantaneous chain length distribution applies for multicomponent polymerizations as well as homopolymerizations.

As far as the chemical composition distribution is concerned, Stockmayer's bivariate distribution (See W. H. Stockmayer, *J. Chem. Phys.*, Vol. 13, p. 199 (1945)) which applies only for binary copolymerizations, covers chain length and composition distributions and is given by $$W(r, y, 0, \bar{t}, t) dr\, dy = \qquad \text{Equation B}$$

$$(1 + \delta(\bar{t})y)(\tau(\bar{t}) + \beta(\bar{t}))\left\{\left(\tau(\bar{t}) + \frac{\beta(\bar{t})}{2}\right)(\tau(\bar{t}) + \beta(\bar{t}))(r - 1)\right\} r *$$

$$\exp\{-(\tau(\bar{t}) + \beta(\bar{t}))r\} dr \frac{1}{\sqrt{2\pi \nabla(\bar{t})}} \exp(-y^2 / (2\nabla(\bar{t})/r)) dy$$

where $W(r, y, 0, \bar{t}, t)$ is the bivariate distribution of chain length r and composition deviation y (deviation from the average mole fraction of monomer 1 in the copolymer) for linear dead binary copolymer chains produced instantaneously at birthtime $\bar{t}$ in a small time interval, $\Delta t$.

$$\nabla(\bar{t}) = \overline{F_1}(\bar{t})(1 - \overline{F_1}(\bar{t})) K(\bar{t}),$$

$$K(\bar{t}) = [1 + 4\overline{F_1}(\bar{t})(1 - \overline{F_1}(\bar{t}))(r_1 r_2 - 1)]^{0.5},$$

$$\delta(\bar{t}) = \frac{\left(1 - \frac{MW_2}{MW_1}\right)}{\frac{MW_2}{MW_1} + \overline{F_1}(\bar{t})\left(1 - \frac{MW_2}{MW_1}\right)},$$

$\overline{F_1}(\bar{t})$ is the mean mole fraction of monomer 1 in the copolymer produced instantaneously at birthtime $\bar{t}$, $r_1$ and $r_2$ are reactivity ratios in the context of the terminal copolymerization model, and $MW_1$ and $MW_2$ are the respective molecular weights of monomer 1 and 2 repeat units in the binary copolymer chains.

Stockmayer's bivariate distribution (Equation B) may be applied to a binary (e.g., 2 monomer types) free-radical copolymerization or to a binary copolymerization with a single-site type coordination catalyst system as is. For a multi-site type coordination catalyst, Stockmayer's bivariate distribution may be applied to each site type, but having different parameters. For example, different site types will have a different pair of reactivity ratios. The use of Stockmayer's bivariate distribution as the bivariate distribution of binary copolymer produced instantaneously is generally available (i.e., calculated by existing art techniques).

Unfortunately, an analytical trivariate distribution which accounts for three monomer types has yet to be derived analytically. However, if chain lengths are sufficiently large, the variance of the composition distribution part of Stockmayer's bivariate distribution approaches zero and one may assume with small error that copolymer chains produced instantaneously all have the same mole fractions of monomer types. This, in turn, may be applied to, say, ternary or higher copolymerizations, and would permit one to readily calculate a trivariate or higher distribution for the accumulated copolymer using Equation A for the weight chain length distribution part.

Polymer Chains with Long Chain Branching.

We are still considering batch and semi-batch operation; however, now long chain branching reactions (chain transfer to polymer, terminal branching (i.e., terminal double bonds at ends of dead polymers) and addition to pendant double bonds for free-radical processes, and terminal branching and addition to pendant double bonds for coordination polymerization) and their effect on the tracking methodology is now considered. With these long chain branching reactions, dead polymer chains may be reactivated to give live polymer chains connected chemically to an active center or site for propagation. In other words, $W(\bar{t},t)$, the weight of dead polymer produced instantaneously at time $\bar{t}$ will decrease in the time interval $t > \bar{t}$, and weight distribution of the instantaneous dead polymer $W(r, i, t, \bar{t})$ may or may not be distorted by the long chain branching reactions.

Terminal branching rate is proportional to the concentration of dead polymer chains and as a consequence will not distort the molecular weight distribution of dead polymer chains having one terminal double bond. The mass of these dead polymer chains will decrease, however. Transfer to polymer and addition to pendant double bonds reactions will distort the molecular weight distribution because these rates are greater for longer chains which have either more extractable backbone atoms or more pendant carbon-carbon double bonds per chain. To illustrate these ideas, we now consider chain transfer to polymer.

Chain Transfer to Polymer.

Suppose that $W(r, i, \bar{t}, t)$ is the weight chain length distribution of dead polymer formed instantaneously at time $\bar{t}$, having $i \geq 0$ long chain branches per polymer molecule. Chains in $W(r, i, \bar{t}, t)$ are consumed, and the distribution distorted by chain transfer to polymer in the time interval $t > \bar{t}$ as follows.

Consider a batch reactor $$\frac{dP(r, i, t, \bar{t})}{dt} = -K_{trp} r P(r, i, t, \bar{t}) Y_0 \qquad \text{Equation C}$$

where $P(r, i, t, \bar{t})$ is the concentration (in moles/dm$^3$) of dead polymer having chain length r, i trifunctional long chain branches per polymer molecule which was born at time $\bar{t}$ at present time t. $K_{trp}$ is the chain transfer to polymer rate constant in dm$^3$/(mole) (min). $Y_0$ is the total polymeric radical concentration in moles/dm$^3$. Equation C may be converted to $$\frac{d P(r, i, N_M, \overline{N_M})}{d N_M} = C_p r P(r, i, N_M, \overline{N_M})/N_M$$

and solved analytically for isothermal polymerization to give:

$$P(r, i, N_M, \overline{N_M}) = P(r, i, \overline{N_M}, \overline{N_M}) \left(\frac{N_M}{\overline{N_M}}\right)^{C_p r} \quad \text{Equation D}$$

where $$C_p = \frac{K_{trp}}{K_p}$$

and $K_p$ is a propagation constant.

Equation D may be used to calculate the distortion experienced by dead polymer chains after birth in the time interval $\bar{t}$ to t. Note that $N_M$ is the number of moles of monomer in the batch reactor at any time t, and $N_M = \overline{N_M}$ at time t=$\bar{t}$.

The calculation of $W(r, i, t, \bar{t})$ using Equation D is then as follows. Equation D may be used to calculate the change in the concentration of dead polymer of chain length r and having i long chain branches per molecule produced "instantaneously" at time $\bar{t}$ later in the time interval, t>$\bar{t}$ and thus the distortion in the distribution due to chain transfer to polymer.

Further, the use of the invention instantaneous property method to calculate $W(r,i,\bar{t},t)$ does not give an analytical solution for branched families with i$\geq$1. The family with linear chains with i=0 has an analytical solution. The frequency distribution $F(r,i,t,t)$ for, i=0, is given by $$F(r,0,\bar{t},t)=(A/B)\eta^2 \exp(-\eta r)$$

where

A=$(\tau(\bar{t})+\gamma(\bar{t}))+(\beta(\bar{t})/2)$ (r-1) $(\tau(\bar{t})+\beta(\bar{t}))$ B=$\eta(\tau(\bar{t})+\gamma(\bar{t}))+(\beta(\bar{t})/2)$ $(\tau(\bar{t})+\beta(\bar{t}))$, $\eta=\tau(\bar{t})+\beta(\bar{t})+\gamma(\bar{t})$ $\tau(\bar{t})$ and $\beta(\bar{t})$ have already been defined.

$$\gamma(\bar{t}) = \left(\frac{K_{trp}Q_1}{K_pM}\right)_{t=\tau} = \left(\frac{C_pQ_1}{M}\right)_{t=\tau}$$

where $K_{trp}$ is the chain transfer to polymer rate constant $Q_1$ is the first moment of all the accumulated dead polymer chains at t=$\bar{t}$.

When $\gamma(\bar{t})=0$ i.e., no chain transfer to polymer occurs, $F(r,0,\bar{t},t)$ is the associated frequency distribution of weight chain length distribution given by Equation A. The weight chain length distribution may be calculated from the frequency distribution of chain length as follows:

$$W(r, 0, \bar{t}, t) = \frac{rF(r, 0, \bar{t}, t)}{\sum_{r=1}^{\infty} rF(r, 0, \bar{t}, t)}$$

In general, the frequency distribution may be calculated using p(r,i,t,$\bar{t}$), the concentration of dead polymer of chain length r and having i trifunctional long chain branch points per polymer molecule as follows:

$$F(r, i, t, \bar{t}) = \frac{P(r, i, t, \bar{t})}{\sum_{r=1}^{\infty} p(r, i, t, \bar{t})}$$

When the invention instantaneous property method does not provide an analytical solution for the population balance equations (such as the Schulz-Flory distribution and Stockmayer's bivariate distribution) it is recommended that the invention instantaneous property method be used to calculate the leading moments for the distribution for dead polymer produced instantaneously and that these moments be tracked through transient and steady-state polymer manufacturing systems. When the full distributions are required at any point in the manufacturing system, a 2-parameter empirical distribution function (such as the Schulz-Zimm distribution) is then used, and the leading moments are used to calculate the two parameters (e.g., $\tau$ and $\beta$ or the Schulz/Zimm parameters) for dead polymer produced instantaneously. Otherwise, calculation of the full distributions numerically for i$\geq$1 would require excessive data storage and computation time.

The weight chain length distribution of the polymer accumulated in a batch reactor for families having i long trifunctional branches per polymer molecule is found by integrating Equation D with respect to $\overline{N_M}$ in the interval 0 to $N_M$ which is equivalent to the time interval 0 to t. When temperature of polymerization is changing with time, however, Equation D should be used piecemeal over a series of short constant temperature intervals. $C_p$ would have a different value for each temperature level. Equation D may also be used to track the leading moments of the distributions for dead polymer produced instantaneously (i.e., polymer pulse). At any point in time, these leading moments may be used to estimate the 2-parameters of say the Schulz-Zimm distribution, and in turn the Schulz-Zimm distribution may be used to solve the moment closure problem.

We now consider continuous operation under transient conditions with steady-state operation as a special case and to illustrate the basic ideas, one CSTR (continuous stirred tank reactor) is considered which is being operated full or with a reacting volume which does not change with time. In other words, we are not considering reactor filling or reactor drainage, which are special cases, for the present discussion.

Figure 1:
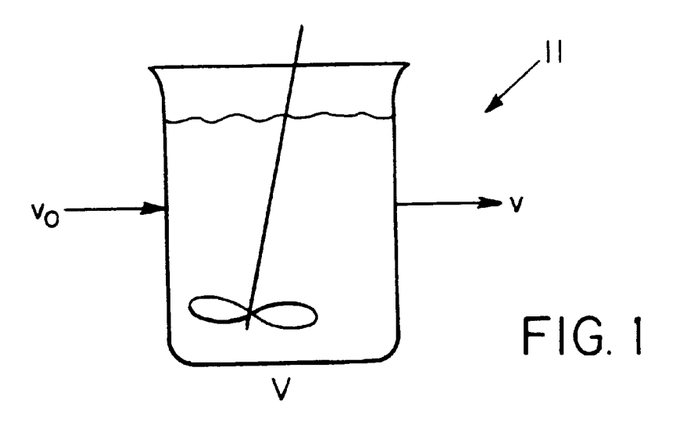
FIG. 1 is a schematic diagram of a reactor system which is modeled by the present invention.

Referring to FIG. 1, $v_0$ is the total volumetric flowrate of all ingredients into the reactor 11 in dm$^3$/minute. v is the total volumetric flow rate of polymer, unreacted monomers, solvent and other ingredients out of the reactor 11 in dm$^3$/min. Generally v<$v_0$. V is the volume of polymerization mass in the reactor 11 in dm$^3$, and may be (i) a homogeneous solution of polymer in monomers and solvent, or (ii) a suspension of polymer particles in a continuous liquid or gaseous phase, which may be an organic or water.

During reactor operation, dead polymer chains are being generated continuously and uniformly throughout the polymerizing volume in the reactor 11. Neglect long chain branching reactions for now, and consider the production of linear homopolymer chains. With continuous operation and outflow, the series of pulses of dead polymer which are formed over a period of time will lose some of their mass due to outflow but their weight chain length distributions will not change due to outflow. $W(t,\bar{t})$, the mass of instantaneous dead polymer (or a pulse of dead polymer) born at time $\bar{t}$ is calculated for the time interval $t>\bar{t}$ as follows:

$$\frac{dW(t,\bar{t})}{dt} = -v\frac{W(t,\bar{t})}{V} = \frac{W(t,\bar{t})}{\theta} \qquad \text{Equation E}$$

where $\theta=V/v$ is the mean residence time of the vessel which is assumed to remain constant during transient operation of the CSTR. This permits an analytical solution of Equation E as follows $$W(t, \bar{t}) = W(\bar{t}, \bar{t}) \exp(-(t-\bar{t})/\theta) \qquad \text{Equation F}$$

If it is necessary to account for the variation of the mean residence time with time (e.g., output flow rate decreases), Equation E may readily be solved numerically. It should also be mentioned that for transient operation of the CSTR, $W(\bar{t},\bar{t})$, $\tau(\bar{t})$ and $\beta(\bar{t})$ will in general change with birthtime of the series of pulses of dead polymer. It should also be mentioned that outflow does not distort or change $W(r, 0, \bar{t},\bar{t})$ in any way, and for this example with linear polymer chains, $W(r, 0, t, \bar{t}) = W(r, 0, \bar{t}, \bar{t})$. Treating $W(t, \bar{t})$ as a continuous variable, the weight chain length distribution of dead polymer accumulated in the CSTR at time t is given by:

$$W(r, 0, t) = \int_0^t W(r, 0, \bar{t}, \bar{t})W(\bar{t}, \bar{t})\exp(-(t-\bar{t})/\theta)d\bar{t}/W_p(t) \qquad \text{Equation G}$$

At steady-state, $W(r,0,\bar{t},\bar{t})$ is independent of birthtime, $\bar{t}$ and the weight chain length distribution of dead polymer in the CSTR is equal to $W(r,0,\bar{t},\bar{t})$. In general for linear homo or copolymer chains $$W(r, 0, \bar{t}, \bar{t}) = \{\tau(\bar{t}) + \beta(\bar{t})\} \qquad \text{Equation A}$$

$$\left\{\tau(\bar{t}) + \frac{\beta(\bar{t})}{2}(\tau(\bar{t}) + \beta(\bar{t}))(r-1)\right\}r * \exp(-\{\tau(\bar{t}) + \beta(\bar{t})\}r)$$

For ionic (coordination or otherwise) catalyst systems, set $\beta(\bar{t})=0$.

For the more general case, where the mean residence time of the CSTR changes with time, Equation G may be written as $$W(r, 0, t) = \int_0^t W(r, 0, \bar{t}, \bar{t})E(t, \bar{t})d\bar{t}/W_p(t) \qquad \text{Equation H}$$

where $W_p(t)$, the total mass of polymer accumulated in the CSTR at time t, is a quantity which is readily available in existing process modeling software for the simulation of polymer reactors.

Let us now consider 2-CSTR's of equal volume in series under transient operation. In the first instance, we neglect volume changes when monomers are converted to polymer and assume that the reactors operate with constant fillage. For two CSTR's of equal volume in series $$W_{12}(t, \bar{t}) = W_{11}(t, \bar{t})\frac{(t-\bar{t})}{\theta}\exp\left(-\frac{(t-\bar{t})}{\theta}\right) \qquad \text{Equation I}$$

where $W_{12}(t,\bar{t})$ is the weight of the pulse of dead polymer formed at time $\bar{t}$ in CSTR(1) which is now in CSTR(2) at some later time t.

$$W_{12}(t) = \int_0^t W_{11}(\bar{t}, \bar{t})\frac{(t-\bar{t})}{\theta}\exp\left(-\frac{(t-\bar{t})}{\theta}\right)d\bar{t} \qquad \text{Equation J}$$

where $W_{12}(t)$ is the total weight of all pulses of dead polymer formed in CSTR(1) in the time interval 0 to t, which is now in CSTR(2) at time t.

$$W_{22}(t,\bar{t}) + (W_{22}(\bar{t},\bar{t}) \exp(-(t-\bar{t})/\theta) \qquad \text{Equation K}$$

where $W_{22}(t, \bar{t})$ is the weight of the pulse of dead polymer formed at time $\bar{t}$ in CSTR(2) which is now in CSTR(2) at some later time t.

To calculate the weight chain length distribution of dead polymer in the exit stream of CSTR(2), we must define $\tau$'s and $\beta$'s, the dimensionless parameters in Equation A, separately for each CSTR as $\tau_1(\bar{t})$, $\tau_2(\bar{t})$, $\beta_1(\bar{t})$, $\beta_2(\bar{t})$. It may be convenient to first calculate $W_{12}$ (r, 0, t), the weight chain length distribution of dead polymer formed in the time interval, 0 to t, in CSTR(1) and now flowing out of CSTR(2) at time t, and then $W_{22}(r, 0, t)$, the weight chain length distribution of dead polymer formed in the time interval 0 to t in CSTR(2) and now flowing out of CSTR(2) at time t. $W_{12}(r, 0, t)$ and $W_{22}(r, 0, t)$ may be later combined to calculate the overall weight chain length distribution in the outlet stream of CSTR(2).

The treatment of any number of CSTR's in series is similar to the above example of two CSTR's in series and straightforward, for linear homopolymer and copolymer chains when the CSTR train is operated in transient mode with reactor reaction volumes constant with time. For CSTR fillage and drainage, a modified procedure must be employed as follows:

Example for reactor fillage: Suppose that we have a single CSTR which is empty at time t=0 when the inlet flows are set to their steady-state values. Let $t_{fill}$ be the time required for the reactor to fill and for species to begin flowing out. For the time interval 0 to $t_{fill}$ applicants consider the operation to be semi-batch and use appropriate procedures to calculate the total weight of polymer and its weight chain length distribution at time $t=t_{fill}$. The weight of this polymer remaining in the CSTR, in the time interval $t \geq t_{fill}$ is given by:

$$W(t, t_{fill}) = W(t_{fill}, t_{fill})\exp\left(-\frac{(t-t_{fill})}{\theta}\right) \qquad \text{Equation L}$$

$W(t_{fill}, t_{fill})$ is the weight of dead polymer in the CSTR when $t=t_{fill}$. For $t \geq t_{fill}$ the weight chain length distribution of this dead polymer accumulated in the CSTR in the time interval 0 to $t_{fill}$, $W(r, 0, t_{fill})$ can be readily calculated using procedures already discussed above. $W(r,0,t,\bar{t})$, where $\bar{t} \geq t_{fill}$, can easily be calculated using procedures already described above for a single CSTR in transient operation.

Next are examples for a train of CSTR reactors operating at steady-state involving the production of linear homopolymer and copolymer chains.

Free-radical polymerization: Consider N-CSTR reactors in series operating at steady state $$W(r, 0) = (m_1 W_1(r,0) + m_2 W_2(r,0) + \ldots + m_N W_N(r,0))/m \quad \text{Equation M}$$

where $W(r,o)$ is the weight-chain length distribution of the dead polymer (a composite of dead polymer produced in each of the N-CSTR) flowing out of CSTR(N), and $m_N$ is the production rate of dead polymer in (gm/unit of time) in CSTR(N). For solving Equation M, total production rate of dead polymer m is readily available in existing process modelling software. That is, existing process modeling software calculates a total or sum of production rates of dead polymer m as $$m = m_1 + m_2 + \ldots + m_N \quad \text{Equation N}$$

The weight chain length distribution of dead polymer formed in reactor N is given by $$W_n(r, 0) = \quad \text{Equation O}$$
$$(\tau_N + \beta_N)\left(\tau_N + \frac{\beta_N}{2}(\tau_N + \beta_N)(r-1)\right) r * \exp(-[\tau_N + \beta_N]r)$$

Coordination multi-site type catalyst system.

Let's now calculate the instantaneous distribution as a composite of instantaneous distributions produced by each site type. Let $m_{ij}$ be the production rate of dead polymer on site type i in reactor j. Then $$W(r, 0) = \sum_{i=1}^{NS} \sum_{j=1}^{NR} m_{ij} W_{ij}(r, 0)/m \quad \text{Equation P}$$

where $W_{ij}(r,0)$ is the weight chain length distribution of dead polymer produced instantaneously on site type i in CSTR j, and $$m = \sum_{i=1}^{NS} \sum_{j=1}^{NR} m_{ij},$$

where NS is the number of site types, and
where NR is the number of CSTR reactors.

Next consider a single CSTR operating at steady-state with long chain branching reactions in effect. With long chain branching reactions, it is appropriate and convenient to consider the weight chain length distributions of different polymer families having 0, 1, 2, 3, etc. long chain branches per molecule. Applicants consider chain transfer to polymer as the sole reaction producing long chain branching. Instantaneous distributions for dead polymer having 0, 1, 2, 3, etc. long chain branches will be independent of birthtime for steady-state operation. The pulses of dead polymer will experience a residence time distribution in the CSTR given by $$E(t) = \left(\frac{1}{\theta}\right) \exp(-(t - \bar{t})/\theta)$$

where the pulse of dead polymer is formed at time $\bar{t}=0$.

Let us consider the consumption of dead polymer chains with i-long chain branches per polymer molecule born at time $t=\bar{t}$ and also the distortion of the weight chain length distribution of these chains, giving $W(r, i, t, \bar{t})$.

$$\frac{d P(r, i, t, \bar{t})}{d t} = -K_{trp} r P(r, i, t, \bar{t}) Y_0 - \frac{P(r, i, t, \bar{t})}{\theta} \quad \text{Equation Q}$$

P is the total polymeric radical constant. $Y_0$ is the total polymeric radical concentration. For a CSTR at steady-state, Applicants assume that $k_{trp}$ and $Y_0$ are constants and integrate Equation C analytically to give:

$$P(r, i, t, \bar{t}) = P(r, i, \bar{t}, \bar{t}) \exp\left[-\left(r K_{trp} Y_0 + \frac{1}{\theta}\right)(t - \bar{t})\right] \quad \text{Equation R}$$

Equation R gives the concentration of dead polymer of chain length r and with i trifunctional long chain branches for the pulse of dead polymer formed at time $\bar{t}$ at some later time t in the CSTR operating at steady-state. In the time interval $\bar{t}$ to t, chains of $P(r,i,\bar{t},\bar{t})$ are removed from the family residing in the CSTR by chain transfer to polymer and outflow from the CSTR. Chain transfer to polymer distorts $P(r,i,\bar{t},\bar{t})$ while outflow reduces $P(r,i,\bar{t},\bar{t})$ but does not distort $W(r,i,\bar{t},\bar{t})$, the weight chain length distribution of this pulse of dead polymer. $P(r,i,t,\bar{t})$ is the concentration of the pulse of dead polymer formed at time $\bar{t}$ which remains in the CSTR at some later time t. The total concentration of dead polymer with chain length r and having i trifunctional long chain branches per polymer molecule in the CSTR at steady-state is given by $$P(r, i) = \frac{R(r, i, \bar{t}, \bar{t}) \theta}{V(r K_{trp} Y_0 \theta + 1)}$$

where $R(r,i,\bar{t},\bar{t})$ is the rate of formation of dead polymer with chain length r and having i trifunctional long chain branches per polymer molecule at steady-state in moles/unit of time and is independent of time $\bar{t}$. $\theta$ is the mean residence time of the CSTR. Note that $$P(r,i,\bar{t},\bar{t}) = R(r,i,\bar{t},\bar{t}) dt/V \text{ in moles/dm}^3$$

Given $W(\bar{t},\bar{t})$ and assuming that dead polymer chains for each branched family, i=1,2,3, . . . when produced instantaneously follow the Schulz-Zimm distribution of chain length, one may readily calculate $P(r,i,\bar{t},\bar{t})$ from the moments mentioned earlier.

Let us now consider two CSTR reactors of equal volume in series operating at steady-state. Now one must account for the fact that say dead polymer chains formed as a pulse in CSTR(1) at time $\bar{t}$ will spend part of the time interval $\bar{t}$ to t in CSTR(1) and some part of time in CSTR(2) with the remaining having flowed out of CSTR(2). It has already been shown how to calculate $P(r,i,t,\bar{t})$ and $P(r,i)$ in CSTR(1) the upstream CSTR reactor. It is more difficult to calculate $P(r,i)$ for the downstream CSTR reactor. We will use subscripts on these quantities to differentiate where they are located, either in CSTR(1) or CSTR(2). For example:

$P_1(r,i,t,\bar{t})$ is the concentration of the dead polymer pulse formed at time $\bar{t}$, in CSTR(1), in moles/dm³ and $P_2(r,i,t,\bar{t})$ is the same but for CSTR(2).

$P_{11}(r,i,t,\bar{t})$ is the concentration of the dead polymer pulse formed at time $\bar{t}$ in CSTR(1), at some later time t in CSTR(1).

$P_{12}(r,i,t,\bar{t})$ is the concentration of the dead polymer pulse formed at time $\bar{t}$ in CSTR(1), at some later time t in CSTR(2).

$P_{22}(r,i,t,\bar{t})$ is the concentration of the dead polymer pulse formed at time $\bar{t}$ in CSTR(2), at some later time t in CSTR(2).

It is difficult to calculate $P_{12}(r,i,t,\bar{t})$ because one must account for these chains, flowing into CSTR(2), being consumed by chain transfer to polymer in CSTR(2) and flowing out of CSTR(2). The following population balance equation applies.

$$\frac{dP_{12}(r, i, t, \bar{t})}{dt} = v_1 * P_{11}(r, i, t, \bar{t}) -$$
$$(r(K_{trp}Y_0))_2(P_{12}(r, i, t, \bar{t}) - v_2 * P_{12}(r, i, t, \bar{t})$$

where $v_1$ and $v_2$ are outlet total volumetric flowrates for CSTR (1) and CSTR(2), respectively $K_{trp}$ and $Y_0$ are the chain transfer to polymer rate constant and total polymeric radical concentration values, respectively, for CSTR(2).

We have an analytical solution for $P_{11}(r,i,t,\bar{t})$ and therefore one can obtain an analytical solution for $P_{12}(r,i,t,\bar{t})$. An analytical solution is also available for $P_{22}(r,i,t,\bar{t})$. One can therefore readily calculate $P_2(r,i)$ the concentration of dead polymer with chain length r and having i trifunctional long chain branches in CSTR(2) at steady state. Thus, $$P_{11}(r, i, t, \bar{t}) = P_{11}(r, i, t, \bar{t})\exp\left[-\left\{(r(K_{trp}Y_0))_1 + \frac{1}{\theta}\right\}\{t - \bar{t}\}\right]$$

$$V\frac{dP_{12}(r, i, t, \bar{t})}{dt} = v_1 * P_{11}(r, i, t, \bar{t}) -$$
$$(r(K_{trp}Y_0))_2 P_{12}(r, i, t, \bar{t})V -$$
$$= v_2 * P_{12}(r, i, t, \bar{t})$$
$$v_1 * P_{11}(r, i, \bar{t}, \bar{t})\exp\left[-\left(r\{K_{trp}Y_0\}_1 + \frac{1}{\theta}\right)(t - \bar{t})\right] -$$
$$(r[K_{trp}Y_0]_2 V + v_2)P_{12}(r, i, t, \bar{t})$$

Therefore $$\frac{dP_{12}(r, i, t, \bar{t})}{dt} = \left(\frac{1}{\theta}\right)P_{11}(r, i, \bar{t}, \bar{t})\exp\left[-\left(r[K_{trp}Y_0]_1 + \frac{1}{\theta}\right)(t - \bar{t})\right] -$$
$$\left(r[K_{trp}Y_0]_2 + \frac{1}{\theta}\right)P_{12}(r, i, t, \bar{t})$$

$$\frac{dP_{12}(r, i, t, \bar{t})}{dt} + A*P_{12}(r, i, t, \bar{t}) = B\exp(-C*t)$$

where $$A = \left(v[K_{trp}Y_0]_2 + \frac{1}{\theta}\right)$$
$$B = \left(\frac{1}{\theta}\right)P_{11}(r, i, \bar{t}, \bar{t})\exp(+C*\bar{t})$$
$$C + \left(r[K_{trp}Y_0)]_1 + \frac{1}{\theta}\right)$$

which is solved using integration factor $\Phi$ as follows.

$$\Phi dP_{12}(r,i,t,\bar{t}) + \Phi A * P_{12}(r,i,t,\bar{t})dt = \Phi B \exp(-C*t)dt$$
$$d\Phi P_{12}(r,i,t,\bar{t}) = \Phi dP_{12}(r,i,t,\bar{t}) + P_{12}(r,i,t,\bar{t})d\Phi$$

therefore $d\Phi = \Phi A dt$ and $\Phi = \exp(At)$.

Further $$d\{P_{12}(r, i, t, \bar{t})\exp(At)\} = B\exp(-(c - A)t)dt$$
$$P_{12}(r, i, t, \bar{t})\exp(A*t) = -\left(\frac{B}{C-A}\right)\exp(-(C-A)t) + IC$$
$$P_{12}(r, i, t, \bar{t}) = \left(\frac{B}{A-C}\right)\exp(-C*t) + IC*\exp(-A*t)$$

when $t = \bar{t}$, $$P_{12}(r,i,t,\bar{t}) = 0$$

thus $$IC = \left(\frac{B}{C-A}\right)\exp(-(C-A)\bar{t}),$$

and $$P_{12}(r, i, t, \bar{t}) = \left[\frac{B}{A-C}\right]\{\exp(-C*t) - \exp[-(C-A)\bar{t}]\exp(-A*t)\}$$

which is the concentration of dead polymer from a pulse formed at time $\bar{t}$ in CSTR(1) at some later time t flowing out of CSTR(2) and into CSTR(3). The solution of $P_{12}(r,i,t,\bar{t})$ is then used to calculate the concentration of dead polymer from the pulse formed at time $\bar{t}$ in CSTR(1) at some later time t in CSTR(3), and so on for subsequent CSTR's.

Thus, it is the foregoing calculations of $P(r,i,t,\bar{t})$ and $P(r,i)$ in a first and subsequent reactors, that provide/enable the present invention tracking of polymer properties and property distributions throughout (in time and location) a polymer manufacturing system.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a digital processor, a method for modeling a polymerization process carried out in a polymer manufacturing system formed of plural reactors and ancillary equipment, the method comprising the steps of:

receiving indications of reactor type and polymers involved in the polymerization process, each polymer having at least one molecular property;

determining instantaneous property measures of the molecular properties of the polymers;

generating and tracking respective instantaneous property distributions of the molecular properties from the determined instantaneous property measures;

from the instantaneous property distributions, calculating full distributions of the molecular properties at any location in the manufacturing system;

using the calculated full property distributions, forming and reporting a model of the polymerization process such that the polymer manufacturing system is modeled; and the method being capable of modeling both linear and non-linear polymerization processes.

2. A method as claimed in claim 1 wherein the step of determining instantaneous property measures includes calculating and tracking instantaneous property measures of the molecular properties throughout the polymer manufacturing system.

3. A method as claimed in claim 1 wherein the molecular properties include molecular weight, composition, stereoregularity and long chain branching, and the step of determining instantaneous property measures includes calculating at least one of molecular weight, composition, stereoregularity and long chain branching.

4. A method as claimed in claim 1 wherein the step of generating and tracking instantaneous distributions includes determining instantaneous property distribution functions of the molecular properties.

5. A method as claimed in claim 1 wherein the step of receiving indications includes an end-user specifying reactor type of batch, semi-batch or continuous operation.

6. A method as claimed in claim 5 wherein the step of end-user specifying includes specifying multiple continuous reactors in steady state.

7. A method as claimed in claim 5 wherein the step of end-user specifying includes specifying multiple transient continuous reactors.

8. A method as claimed in claim 1 wherein the step of generating and tracking includes calculating and tracking respective mass of pulses of polymers produced in the reactors of the polymer manufacturing system.

9. A computer based simulator for simulating a polymer manufacturing system formed of plural reactors and ancillary equipment for carrying out a polymerization process, the simulator comprising: input means supportable by a digital processor, for enabling an end-user to provide indications of reactor type and polymers involved in the polymerization process, each polymer having at least one molecular property;

a calculating member responsive to the input means for determining instantaneous property measures of the molecular properties of the polymers throughout the polymer manufacturing system, and from the determined instantaneous property measure, the calculating member calculating full property distributions at any location in the manufacturing system, said full property distributions at any location in the manufacturing system forming a model of the polymerization process;

a reporter coupled to the calculating member for reporting the model of the polymerization process using the calculated full property distributions, such that the polymer manufacturing system is modeled; and the simulator being capable of simulating both linear and non-linear polymerization processes.

10. A simulator as claimed in claim 9 further comprising a tracking member coupled to the calculating member, the tracking member tracking instantaneous property measures and instantaneous distributions of the properties, including respective mass of pulses of polymers produced in the reactors of the polymer manufacturing system, throughout the polymer manufacturing system.

11. A simulator as claimed in claim 9 wherein the molecular properties include molecular weight, composition, stereoregularity and long chain branching, and the calculating member determines at least one of instantaneous molecular weight measures, instantaneous composition measures, stereoregularity and instantaneous long chain branching measures.

12. A simulator as claimed in claim 9 wherein the calculating member further determines property distribution functions of the molecular properties.

13. A simulator as claimed in claim 9 wherein the input means further enables an end-user to specify reactor type of batch, semi-batch or continuous operation.

14. A simulator as claimed in claim 13 wherein the end-user specifying includes specifying multiple continuous reactors in steady state.

15. A simulator as claimed in claim 13 wherein the end-user specifying includes specifying multiple transient continuous reactors.

16. A method of tracking polymer properties, including molecular, rheological and mechanical properties, of pulses of polymer produced in a polymerization process of a polymer manufacturing system, there being a plurality of site types produced in the polymerization process, and the manufacturing system including polymer reactors and ancillary equipment, comprising the steps of:

(i) identifying a mass and birth time of polymer pulses formed on each one of plural reactors and ancillary equipment in the polymer manufacturing system;

(ii) for each polymer pulse, obtaining instantaneous property measures of the polymer properties at birth time of the pulse and thereafter in the polymer manufacturing system; and (iii) summing the obtained instantaneous property measures of the polymer pulses across all pulses formed in the polymer manufacturing system, to determine full distributions of the polymer properties for a composite polymer at any point in the manufacturing system, the method being capable of tracking both linear and non-linear polymerization processes.

17. A method as claimed in claim 16 wherein the step of obtaining includes calculating the instantaneous property measures of polymer properties including at least one of molecular properties, rheological properties and mechanical properties.

18. A method as claimed in claim 16 wherein the step of obtaining further includes calculating the instantaneous properties of the polymer pulses at various times and points in the polymer manufacturing system.

19. A method as claimed in claim 16 wherein the method further includes the step of using computer means to perform the steps of (i), (ii) and (iii).

20. A method as claimed in claim 19 wherein the method further includes the step of modeling the polymer manufacturing system from the determined full distributions of the polymer properties.

21. A method as claimed in claim 16 wherein the polymer manufacturing system is operating under transient or steady-state conditions using catalysts or free radicals with a plurality of active center types;

the polymerization process includes at least one of solution, slurry, gas phase, suspension and emulsion polymerization, and the polymer reactors (a) have a respective operator type of one of batch, semi-batch and continuous operation, and (b) include one of a continuous stirred tank reactor, a plug flow tank reactor and any combination thereof; and the method further includes the step of modeling the polymer manufacturing system from the determined full distributions of the polymer properties.

22. A method as claimed in claim 21 wherein the method further includes the step of employing computer means to perform the steps of (i), (ii) and (iii).

23. A method as claimed in claim 16 wherein the step of summing includes employing appropriate mixing rules to determine respective full distributions of polymer properties of the composite polymer, said polymer properties including at least one of molecular properties, rheological properties and mechanical properties.

* * * * *